United States Patent [19]

Poe

[11] Patent Number: 4,470,609
[45] Date of Patent: Sep. 11, 1984

[54] CONDUIT-CONNECTOR STRUCTURE WITH SEALING RING THEREFOR

[75] Inventor: Jack L. Poe, Riverton, Utah

[73] Assignee: Rocky Mountain Nuclear Mfg. & Engineering Co., Inc., Salt Lake City, Utah

[21] Appl. No.: 516,969

[22] Filed: Jul. 25, 1983

[51] Int. Cl.³ .............................................. F16J 15/06
[52] U.S. Cl. ................................... 277/170; 277/101; 277/207 A; 277/236; 277/DIG. 6; 285/334.2; 285/336
[58] Field of Search ........................ 277/101, 170–172, 277/207 A, 236, DIG. 6; 285/108, 113, 334.2, 336, 365

[56] References Cited

U.S. PATENT DOCUMENTS

| | | | |
|---|---|---|---|
| 2,376,017 | 5/1945 | Smallpiece | 277/170 X |
| 2,753,197 | 7/1956 | Loeffler | 285/336 |
| 3,479,063 | 11/1969 | Raver | 277/236 X |
| 3,489,420 | 1/1970 | Woodling | 277/170 X |
| 3,507,506 | 4/1970 | Tillman | 285/334.2 X |
| 3,820,830 | 6/1974 | Dryer | 285/336 |
| 3,993,332 | 11/1976 | Borodin et al. | 285/336 X |
| 4,214,763 | 7/1980 | Latham | 277/236 X |

FOREIGN PATENT DOCUMENTS

| | | | |
|---|---|---|---|
| 2616512 | 10/1977 | Fed. Rep. of Germany | 285/336 |
| 2623157 | 11/1977 | Fed. Rep. of Germany | 285/334.2 |
| 213654 | 5/1941 | Switzerland | 285/108 |
| 201111 | 7/1923 | United Kingdom | 285/334.2 |
| 432729 | 8/1935 | United Kingdom | 277/207 A |
| 2018926 | 10/1979 | United Kingdom | 285/334.2 |

Primary Examiner—Robert S. Ward
Attorney, Agent, or Firm—M. Ralph Shaffer

[57] ABSTRACT

A conduit-connector coupling structure, otherwise sometimes known as a clamp-type connector, incorporates plural clamp segments operating to cam together flange members producing the coupling. Clamp segments are employed with connecting attachment means so as to draw together the flange members employed upon the tightening down of the clamp segments relative to each other. The forward flange portions of each of the flange members are provided with recesses mutually accommodating the insertion of a metallic sealing ring. When the flange members are drawn together the sealing ring is held in radial compression. The ring itself is oppositely tapered at opposite sides and includes at least one and conceiveably multiple non-metallic seals hereinafter referred to as softseals, which are mounted on a primary ring member. The primary ring member thus includes suitable recesses for accommodating such softseals at its opposite recessed sides. The ring member itself will be metallic and at least portions of its upper surfaces will serve as to control surfaces for limiting compression of the softseals to predetermined amounts. The fluid-coupling seal structure in this invention is intended to accommodate structures where sealing pressures are relatively low, i.e., do not exceed 10,000 psi.

13 Claims, 9 Drawing Figures

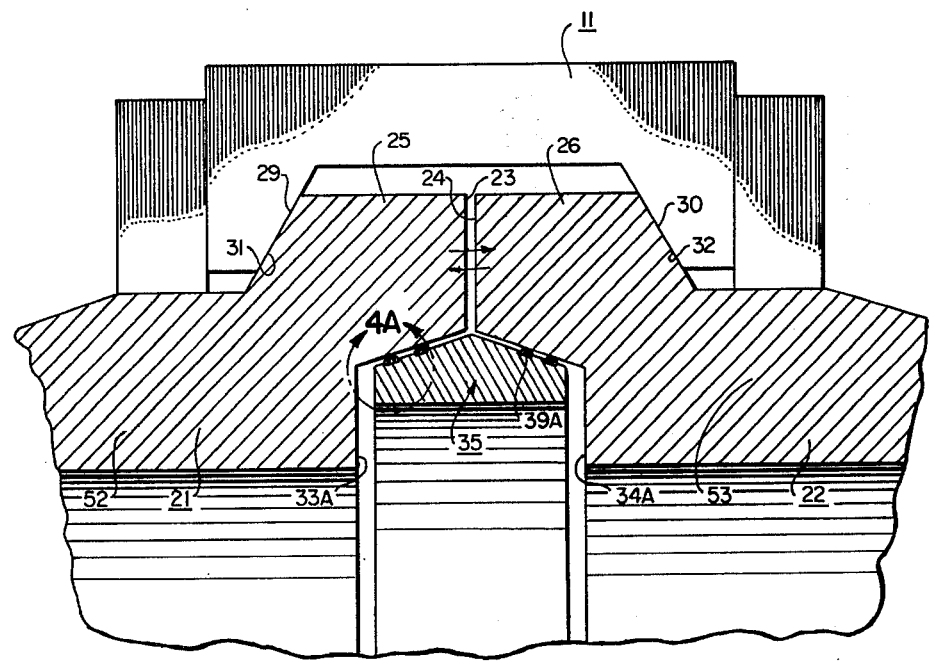
Fig. 4
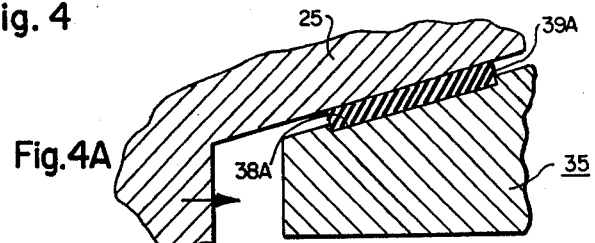
Fig. 4A
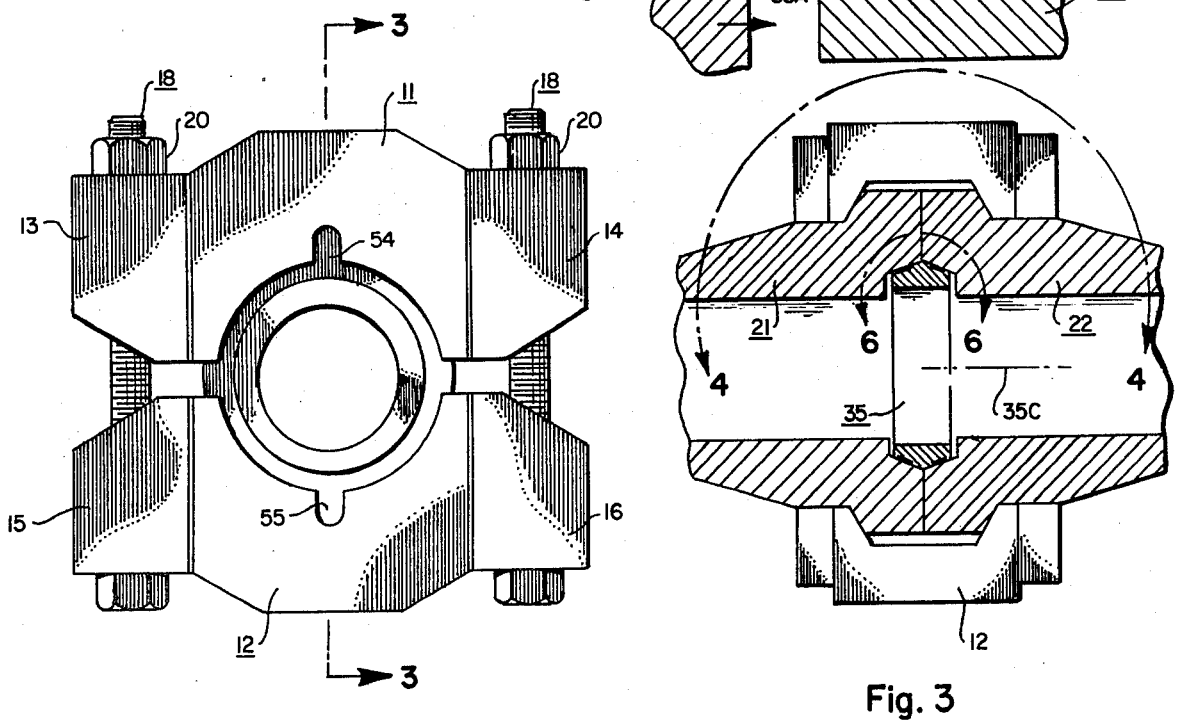
Fig. 2
Fig. 3

CONDUIT-CONNECTOR STRUCTURE WITH SEALING RING THEREFOR

FIELD OF INVENTION

The present invention relates to conduit connector structure or coupling means whereby two fluid conduits may be securely coupled together in a manner to avoid leakage. In this invention the sealing ring employed to effect seal integrity has oppositely tapered outer peripheral sides which have one or more respective recesses accommodating softseals, the latter being intended to produce fluid pressure seals between the ring structure and that structure within which it is emplaced. The surfaces of the outer peripheral sides are designed to be control surfaces, both limiting outward extrusion of the softseals as these are brought under compression, and also to provide control surfaces whereby to limit to a desired degree the compression of such softseals.

DESCRIPTION OF PRIOR ART

In the past, many types of couplings have been employed to secure together fluid conduit. These conventionally employ gaskets, rubber or other elastomeric sealing rings, rubber O-rings, and so forth. While seal rings are certainly not unknown in this art, see following U.S. patents: Latham U.S. Pat. No. 3,325,176 and Latham U.S. Pat. No. 4,214,763. The prior art above-mentioned is relevant as regards the concept of using seal rings having conical cross-sections. Neither of the patents, however, teach the incorporation of an annular metallic ring, having oppositely tapered sides, wherein such sides are utilized as control surfaces for softseals appropriately recessed in such sides. Heretofore, great difficulty has been encountered in field work where there has existed corrosion or scoring of the seal seats of fluid couplings. It is believed to be the first time wherein softseals are utilized which can readily fit the contour of the seal seats, even though damaged, by virtue of their elastomeric nature. Thus, the difficulties which have heretofore existed in connection with servicing equipment in the field relative to fluid couplings, has been overcome without the otherwise prerequisite disassembling the coupling, re-machining mating parts, and so forth.

BRIEF DESCRIPTION OF THE INVENTION

According to the present invention, inter-conduit coupling is effected through the employment of a pair of flange members which are urged together by camming clamps the latter being secured together and tightened down by bolts, threaded studs, and the like. Each of the flange members include an inner essentially conical or tapered surface serving as respective seats for the sealing ring employed. The sealing ring member generally includes an upstanding medial peripheral apex defined by downwardly sloping sides. Such annular sloping sides serve as control surfaces as hereinafter explained. Such sides will include one or more recesses for accommodating softseals of various types, depending upon the operating temperatures and pressures to be experienced by the fluid coupling. For elevated temperatures and pressures, a ribbon tape known under the trademark GRAFOIL can be used. This is a graphite material contained in a silicone binder. These, of course, may be made into an annular ring or simply overlapped, as the case may be; in both cases the same will comprise an annular member, the surfaces of tape adhering together where the same is in ribbon form. For moderate temperatures and pressures, TEFLON or other plastics can be employed. At lower temperatures, rubbers, neoprene, or other rubber-type elastomerics may be used. In all cases the material will be non-metallic and have some elasticity inherently exhibiting restoration forces when the same is held under compression in a sealing condition.

The outer surfaces of the metallic ring mounting such softseals themselves serve as control surfaces for both precluding the extrusion of outer ring materials beyond the grooved mountings and, in addition, predetermining the extent of compression of such rings and hence predetermining the desired seal effectiveness needed and engineered into the product. It is not intended that the metal-to-metal contact used as between the metallic ring and the metallic seal seats into which the ring is emplaced have any appreciable surface-to-surface fluid-seal effect; rather, the seating function is carried out by the non-metallic softseals employed in the design of the sealing ring and their engagement with the seal seats of the fluid conduit coupling structure. For even GRAFOIL type softseals, sealing pressures will be less than 10,000 psi and operating temperatures less than 400° C. An important feature of the invention is that the softseals at their surfaces adapt to scoring, corrosion and other conditions that might exist in connection with the metallic seal seats which they are intended to sealingly engage. Thus, field installations are easily accommodated by the insertion of these sealing rings with their softseals in lieu of those sealing rings that might have malfunctioned or failed in the field. Hence, leakage problems are easily corrected in field conditions. The seals of the present invention, of course, are likewise well-adapted to initial manufacture and initial installations other than simply being intended for re-work functions.

OBJECTS

Accordingly, a principal object of the present invention is to provide new and improved conduit connector structure.

A further object is to provide a new and improved fluid coupling.

A further object is to provide a fluid-coupling suitable for handling corrosive or other fluids under pressure or vacuum conditions where desired seal pressures are of the order of less than 10,000 psi.

A further object is to provide fluid sealing structure wherein a sealing ring is incorporated, the same having resilient, compressible softseals.

A further object is to provide in sealing structure a metallic sealing ring having non-metallic softseals, the same being resilient and compressible and yet held by control surfaces, acting against outward extrusion and also excessive compression pressures, thereby insuring that the seals can properly function and will not be compressed to a condition beyond their respective yield points.

A further object is to provide in fluid sealing structure a tapered metallic ring having opposite side surfaces that accommodate annular softseals, this to accommodate both well-maintained seal-seat surfaces as well as those that might be scored, corroded or otherwise deformed.

BRIEF DESCRIPTION OF DRAWINGS

The features of the present invention, together with further objects and advantages thereof, may best be understood by reference to the drawings in which:

FIG. 2 is an end view of the structure of FIG. 1 and taken along the section line 2—2 in FIG. 1.

FIG. 3 is a cross-section of the structure of FIGS. 1 and 2 and is taken along the line 3—3 in FIG. 2.

FIG. 4 is an enlarged fragmentary sectional detail of the structure shown within the arcuate line 4—4 in FIG. 3, shown immediately prior to seal-seating, 2, additional seals being employed.

FIG. 4A is enlarged fragmentary section detail taken along the line 4A in FIG. 4, illustrating the approach of the left-hand flange member toward the sealing ring as the clamp halves are tightened together.

FIG. 5A illustrates the movement of a flange member in the direction of the arrow, shown in FIG. 5A whereby to commence the compression of the seal rings to the position shown in FIG. 5B.

DESCRIPTION OF PREFERRED EMBODIMENTS

Figure 5A:
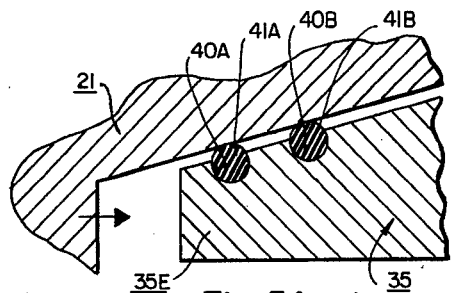
FIG. 5A is a fragmentary detail taken along the arcuate line 5A—5A in FIG. 5, illustrating the substitution of O-ring type seals in lieu of the flat seals of FIG. 5.

In the drawings the conduit connector structure 10 is shown to include an upper clamp segment 11 and a lower clamp segment 12. Each of these segments have respective bosses 13-16 which are integral relative to the respective clamp segments and which are provided with apertures 17 receiving bolts 18, the same being four in number. The bolts may comprise threaded shanks 19 having opposite end nuts 20 or may simply be headed bolts having respective end nuts.

Of further importance in the construction of the conduit connector structure 10 is the provision of a pair of flange members 21 and 22, the same having mutually facing annular, mutually facing end surfaces or faces 23 and 24, flange portions 25 and 26, and flange bodies 27 and 28, the latter being integral with the respective flange portions 25 and 26.

Annular, inclined or tapered surfaces 29 and 30 of flange portions 25, 26 are essentially disposed at the same angle as the inner inclined surfaces 31 and 32 of each of the clamp segments 11 and 12. Importantly, annular recesses 33 and 34 are essentially defined by annular surfaces 33A, 33B, and 34A, 34B, are contiguous with surfaces 23 and 24, respectively, and cooperatively receive sealing ring 35, the latter having central axis 35C.

As is shown in the drawings, sealing ring member 35D has opposite sides 56 and 57 provided with annular, oppositely tapered surfaces 36A and 36B. These surfaces will be provided with one or more recesses 38A, 38B, each of which will be provided with an appropriately dimensioned and contoured non-metallic softseal. The terms "softseal", as used herein, refers, e.g., to any type of non-metallic seal, made of natural or synthetic rubber, and material such as Teflon, or even a wrapped graphite tape comprised of graphite in a silicon binder. What is essential, whether the softseal is an initial annular form or is simply a wrapped tape, is simply that the same be pressible and resilient along the radial dimensions of the seal. Thus, a respective sealing ring 35 will have a metallic ring member 35D and also a series of softseals that are mounted into the recesses of the metallic ring 35D.

Figure 6:
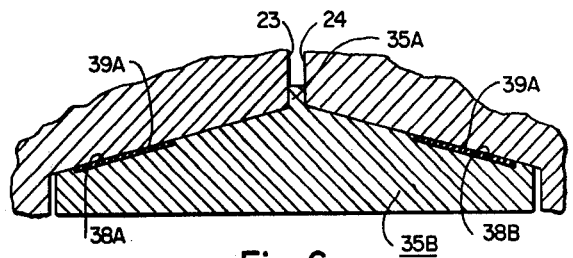
FIG. 6 is a fragmentary detail of an upper portion of the structure in FIG. 3, as is enclosed in the arcuate line 6—6, but which now illustrates the sealing ring as incorporating a peripheral, central, apex rib.
Figure 5B:
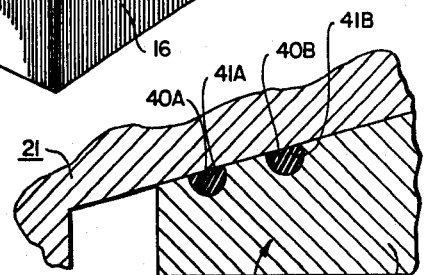
FIG. 5B is similar to FIG. 5A but illustrates, again, the compression of the seal rings wherein the exterior control surfaces of the metal sealing ring are brought into engagement with the tapered interior surfaces of the flange members of the device.
Figure 5:
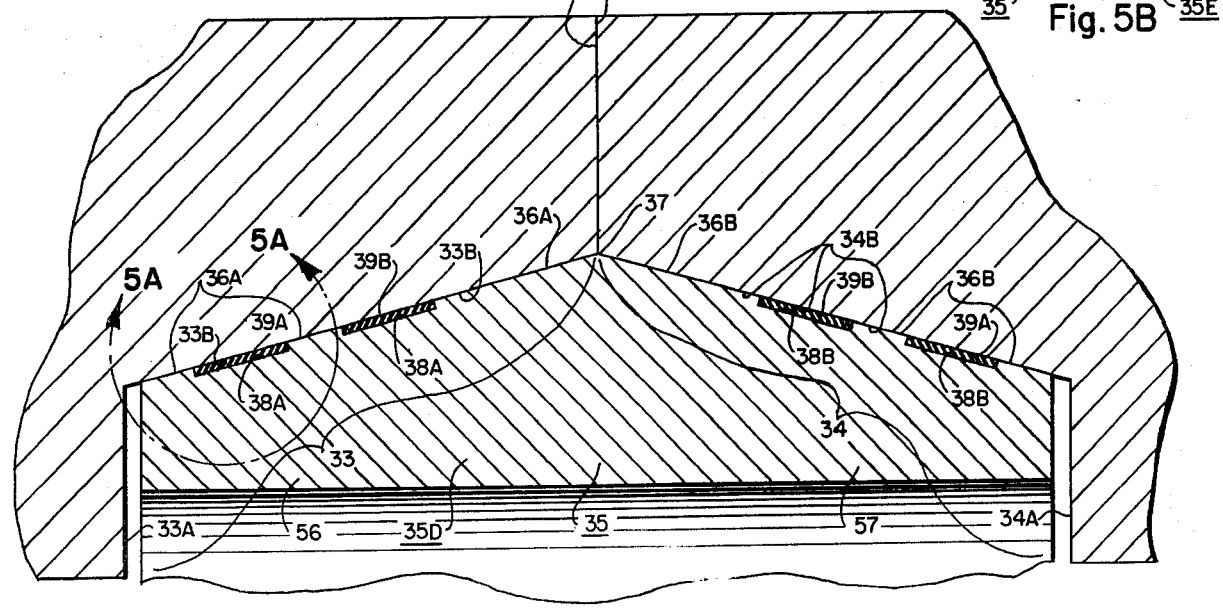
FIG. 5 is an enlarged transverse section of an upper central portion of the structure in FIG. 4, and is shown in fragmentary section detail, illustrating the seating position of the softseals against the tapered seats of the respective flange members of the coupling structure.

Such seals may have a relatively flat unit cross-section as is shown at 39A in FIG. 6, by way of example, in addition to those disclosed in FIG. 5. FIG. 4A illustrates that the seals 39A, by way of example, in their relaxed condition, will extend upwardly above the rear or control surfaces 36A and 36B of the metallic sealing ring member 35D. When the respective flange member is advanced in the direction of the arrow shown in FIG. 4A, then the softseals will be compressed until their upper surfaces are essentially in line with the control surfaces 36A, 36B, of the metallic sealing ring 35D. The control surfaces prevent the outward extrusion of the material laterally beyond their seats, and, in addition, provide a control such that the softseals are not compressed below their yield point and beyond their normal resilient elastic range. Accordingly, see FIG. 5, there are no lateral outward bulges of ring material; rather, the same is confined strictly within the recesses 38A, 38B of the metallic sealing ring 35D.

FIGS. 5A and 5B illustrate alternate constructions for the sealing ring 35 wherein this time, the metallic sealing ring member 35E has rounded grooves accommodating O-ring seals as primary and backup seals, by way of example. The seals are identified as 41A and 41B in FIG. 5A, these being disposed within the annular recesses 40A, 40B which are transverse rounded configurement as to their bottoms. FIG. 5A illustrates the approach of a respective flange member 21 to the right as shown by the arrow so as to compress the seals down to the contact of the control surfaces of sealing ring member 35E with the tapered sealing walls of the respective flange members. FIG. 4 illustrates the condition of the flange members 21 and 22 as they approach each other to effect a compression of the softseals down to the levels of the control surfaces of the metallic sealing ring.

FIG. 6 is a slight modification of the invention wherein a sealing ring includes a ring member 35B having an outwardly extending annular radial rib 35A serving to enable exact alignment and retention of the flange members at the end of the torquing of the attachments 18-20 in FIG. 2. Such a positive bringing together of the faces of the flange members and torquing down of the bolt attachments in either case, whether the rib 35A is used or not, tend to preclude deleterious effects of thermal cycling and/or bending moment at the junction of the faces 33, 34 of the flange members, so as to keep the overall coupling construction in alignment.

In operation, broadly, the upper and lower clamp segments 11 and 12 are brought together tightening of nuts 20 relative to bolts 18. Owing to the tapered character of the surfaces 29–32, see FIG. 4, the flange members will be progressively brought together such that faces or surfaces 23 and 24 in FIG. 4 gradually approach each other. Flange members are dimensioned such that their faces will contact only after the requisite seal pressures have been produced as between the exterior surfaces of the softseals and the seal seats 36A, 36B, as relates to the interior annular tapered surfaces of the flange members 21, 22. These requisite pressures are predesigned and predetermined such that they will exist at the time when the control surfaces 36A, 36B of the metallic sealing ring just contacts at least in this range, the interior sealing seat surfaces of the flange members. Contact, depending upon circumstances, will be sufficient to produce a loading of perhaps not more than 200–300 psi between the metal to metal contact of the metal sealing ring and the flange member interior annular seats.

In all cases, however, the softseal inclusion of the sealing ring in the construction of this invention is intended not only for initial manufacturing purposes, for initial installations, but also for rework in the field. It is to be observed that by virtue of the resilient non-metallic character of the softseals, interior scoring, effects of abrasion and wear, and even pitting and corrosion effects of the flange member seal seats can be accommodated by virtue of the resiliency of the softseals and their ability to exert pressure on such irregular surfaces for sealing purposes.

For pressures of the order of 7,000–10,000 psi and at higher operating temperatures, it is suggested that the softseal take the form of a ribbon such as that going under the trademark GRAFOIL, the same being a graphite ribbon employing graphite in a suitable silicone binder.

For other operating pressure and temperature conditions which are somewhat less severe, it is suggested that one of several polymers or plastics, such as TEFLON, can be employed either in tape or ring from to constitute the softseals.

For still further reductions in operating temperature and pressure, natural or synthetic rubbers, such as neoprene or butadiene, can be employed as the softseals.

It is noted that the control surfaces as at 36A, 36B will not allow the seals to be compressed more than their predesigned yield points. Rather, the recesses can be provided for such a depth to accommodate complete compression of the softseals, that is to the point where their upper surfaces are in line with the control surfaces of the ring, so that further compression will not be experienced by such softseals. In this way sealing ring integrity is preserved.

Figure 1:
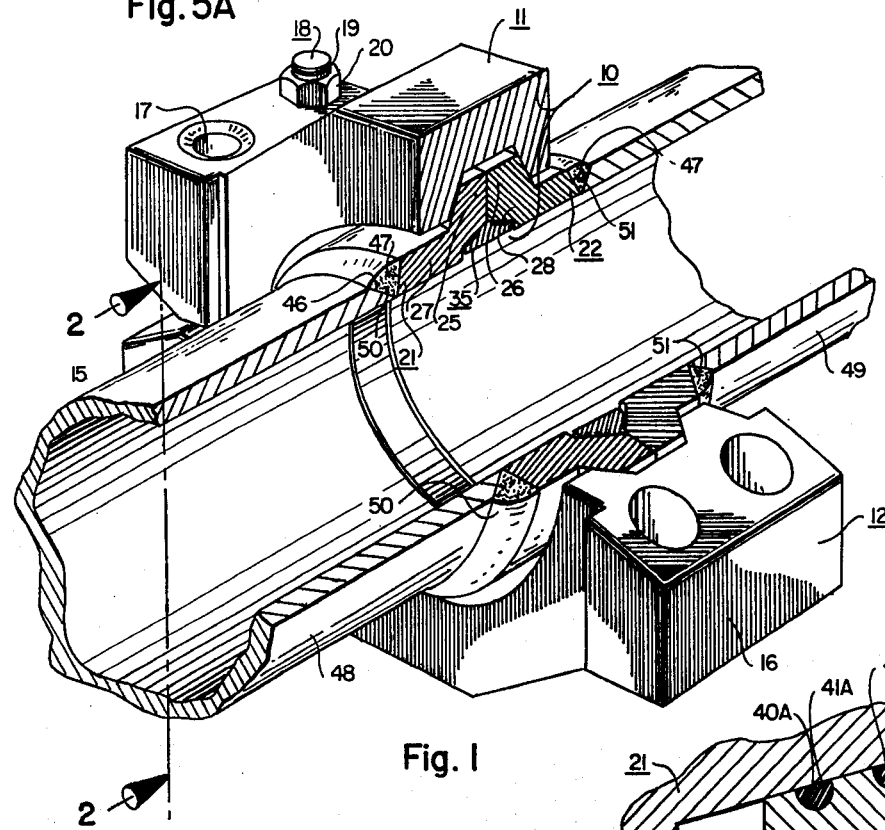
FIG. 1 is a perspective view, partially broken away and sectioned, of the conduit connector structure of the present invention in a preferred embodiment thereof, showing the flange member faces abutting each other.

To complete the overall coupling installation, end chamfers as at 46 and 47 accommodate butt weld connection to align conduit 48 and 49. See FIG. 1. The welds are shown at 50 and 51. There are many types welds configurations recessed, closings and attachment means that can be employed in lieu of the butt weld approach here given. What is important is that the coupling between the two conduits 48 and 49 take the form as that shown in FIG. 1.

In fabrication, then, the individual flange members 21 and 22 are preliminarily secured to the intended conduit. The flange members are then brought into alignment in a manner shown in drawings and the clamp segments are installed over the flange portions in the manner seen in FIG. 1.

As to certain additional structural details, portions 52 and 53 of each of the flange members are thickened with respect to the conduits 48 and 49, as indicated, to provide additional strength proximate the flange and sealing areas. Relief areas 54 and 55 may comprise simply recesses or slots in the individual upper and lower clamp segments, thereby providing certain stress relief when the clamp segments are tightened down by the bolt structures 18.

Accordingly, pressure-seals are provided by the camming action of the clamp elements against surfaces 29 and 30 which urge the flange members 21, 22 toward each other, this resulting in the annular compression of the ring at its softseals within their elastic limit.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination, a pair of flange members having mutually-facing faces each provided with mutually corresponding annular recesses forming inner, annular, inclined, uniform, seal-seat surfaces; a fluid-seal sealing ring disposed in said recesses, said sealing ring comprising a metal sealing ring member having oppositely tapered, opposite annular sides, each side having an outer, uniformly tapered, annular, essentially fixed control surface and being provided with at least one recess contiguous with such control surface, said sealing ring also having plural, compressible, resilient, non-metallic softseals fit-seated against relative lateral movement in respective ones of said recesses and, when non-compressed by said flange members, extending above said control surfaces, said softseals engaging respective ones of said seal-seat surfaces, and means for advancing said flange members toward each other to compression-load said sealing ring in radial directions perpendicular to its central axis, whereby to pressure-seat said ring at said softseals against said seal-seat surfaces and thereby provide fluid seals thereat while simultaneously bringing said seal-seat surfaces toward said control surfaces which restrict compression of said softseals to their elastic limits.

2. The structure of claim 1 wherein said ring has a nominal end-to-end thickness dimension smaller than the combined depths of said recesses.

3. The structure of claim 1 wherein said ring is so sized, relative to the dimensions of said flange members, such that said ring is solely radially compression loaded.

4. The structure of claim 1 wherein each of said recesses has a tapered outer wall, said softseals of said sealing ring have corresponding, outer, annular, tapered surfaces respectively cooperating with said tapered outer wall of each of said recesses.

5. The structure of claim 1 wherein said seal-seat surfaces are congruent with said control surfaces.

6. The structure of claim 1 wherein said flange members have annular, outer, sloping, camming surfaces, said means comprising plural clamping segments having camming means operably engaging said camming surfaces and attachment means coupled to said clamping segments for drawing said segments mutually toward each other and thereby urging said flange members together.

7. The structure of claim 1 wherein said control surfaces contact said seal-seat surfaces, said softseals being constructed for radially transverse compression down to the level of said control surfaces, respectively, within the elastic limit of the softseals' material.

8. The structure of claim 1 wherein each of said sides of said metal sealing ring member having plural annular recesses disposed proximate respective ones of said control surfaces, and plural softseals fit-seated against relative lateral movement within respective ones of said recesses and radially extending above, yet being radially compressible down to the level of, respective ones of said control surfaces.

9. The structure of claim 1 wherein said softseals are comprised of one of the following groups of materials: graphite tape, natural rubber, synthetic rubber, elastomeric polymers, and resilient plastics.

10. The structure of claim 1 wherein the depth of respective ones of said recesses is dimensioned such that, when said control surfaces engage said seal-seat surfaces, said softseals are not compressed beyond their elastic limits.

11. In combination, a pair of axially aligned, hollow flange members each having a face provided with an inner edge recess, means for drawing said flange members together coupled thereto, each of said recesses being defined by a respective, annular, outwardly sloping sealing wall, a sealing ring seated in said recesses and abutting respective ones of said sealing walls, said ring comprising a metal sealing ring member having an outer peripheral surface provided with opposite, downwardly tapered annular sides each provided with at least one recess, said ring having plural non-metallic, radially compressible, resilient softseals respectively disposed in said recesses and extending radially above said sides when in relaxed condition and being compressed within their elastic limits down to the level of said sides when in compressed, sealing condition when sealingly engaging respective ones of said sealing walls.

12. In fluid-conduit coupling structure having first and second fluid conducting members individually provided with annular oppositely sloping seal surfaces and means for forcing said members toward each other: an improvement comprising a sealing ring having a metal sealing ring member interposed between said first and second members for radially inward compression loading thereby, said ring member having opposite, oppositely-tapered sides, each of said sides having at least one annular recess, said ring also including softseals respectively seated in respective ones of said recesses, extending above said sides in their relaxed condition, and being compressed essentially down to the level of said sides when pressure-engaging and seating at corresponding ones of said seal surfaces.

13. The structure of claim 12 wherein said ring member has a radially outwardly projecting rib disposed between said fluid conducting members, said rib having a thickness dimension less than that required to interfere with the radial compression loading of said ring when in service operation.

* * * * *